Figure 1:
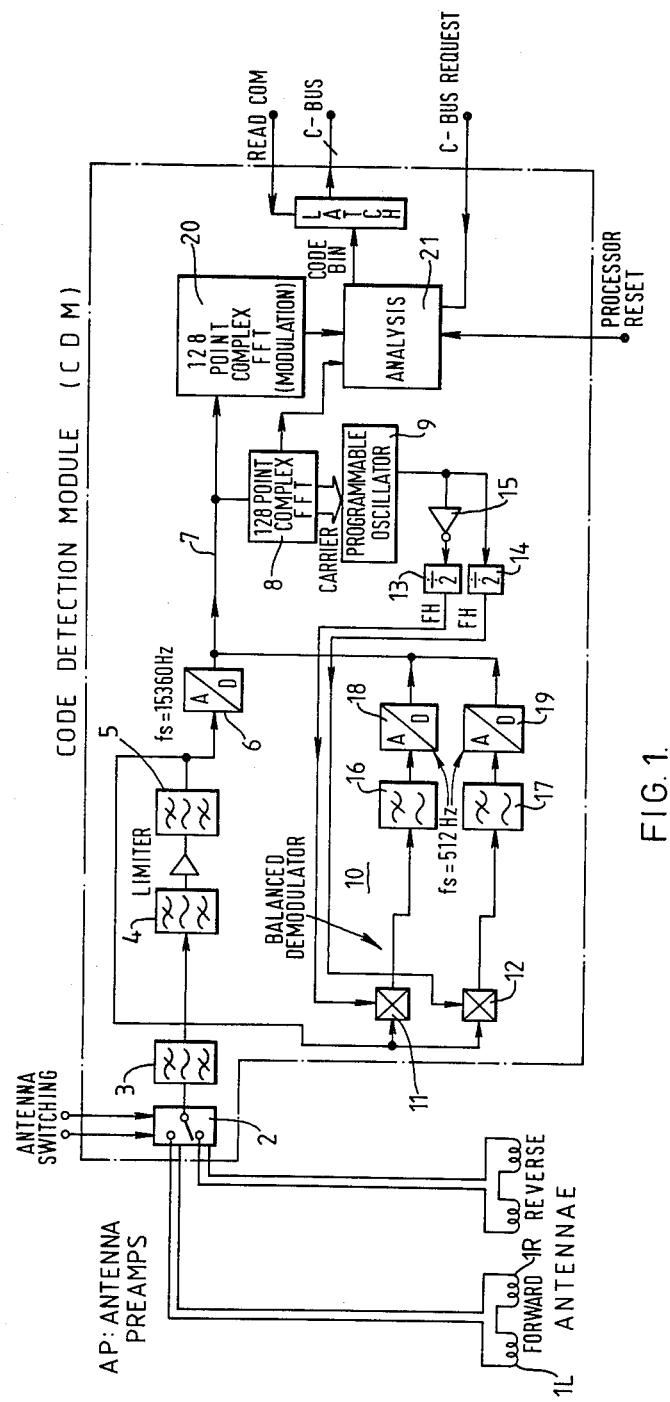

United States Patent [19]  [11] Patent Number: 4,763,290
Cowen  [45] Date of Patent: Aug. 9, 1988

[54] APPARATUS FOR PERFORMING A FAST FOURIER TRANSFORM

[75] Inventor: David W. Cowen, Corsham, England

[73] Assignee: Westinghouse Brake & Signal Co., Ltd., England

[21] Appl. No.: 855,247

[22] Filed: Apr. 24, 1986

[30] Foreign Application Priority Data

Jun. 3, 1985 [GB] United Kingdom ............... 8513959

[51] Int. Cl.[4] ........................ G06F 15/332 A
[52] U.S. Cl. ............................ 364/604; 364/602
[58] Field of Search ............. 364/604, 819, 728, 827, 364/602

[56] References Cited

U.S. PATENT DOCUMENTS 3,950,750  4/1976  Churchill et al. ............. 342/174
4,612,545  9/1986  Asendorf et al. ............. 364/485 X
4,665,366  5/1989  Mikovski ...................... 324/309

Primary Examiner—Jerry Smith
Assistant Examiner—Charles B. Meyer
Attorney, Agent, or Firm—Nilsson, Robbins, Dalgarn, Berliner, Carson & Wurst

[57] ABSTRACT

In a railway vehicle safety system, a frequency modulated signal is transmitted to a vehicle informing, inter alia, of a safe maximum speed, the said speed being represented by the carrier modulation frequency. In addition, the frequency of the carrier may possess one of a number of alternative frequencies. Apparatus for analysing received signals to identify the carrier frequency and the modulation frequency employs a fast Fourier transform processor. In order to save computation time by eliminating useless calculations, a received signal is heterodyned by a local signal selected according to the carrier frequency identified and the base-band components are analysed to identify the modulation frequency. A first stage transform is performed to identify the carrier signal and select the local signal frequency for a complex heterodyne process in a second stage in which local signals in phase quadrature are mixed with the received signal and the results sampled to provide data for real and imaginary data arrays for the transform process. As a result of the second stage process, noise and common mode interference signals are rejected.

6 Claims, 1 Drawing Sheet

APPARATUS FOR PERFORMING A FAST FOURIER TRANSFORM

The present invention relates to apparatus for performing a discrete Fourier transform and especially a fast Fourier transform. In particular the invention is concerned with improvements to apparatus which accepts a coded signal, performs a fast Fourier transform on real time series samples thereof and analyzes the resulting frequency spectra for the purposes of determining the frequencies present in the original signal.

The Fourier transform operation is well known and a discrete Fourier transform algorithm by Bergland and a fast Fourier transform algorithm by Cooley and Tukey are discussed at length elsewhere. Apparatus for performing a fast Fourier transform based on the Cooley and Tukey algorithm is discussed in published British patent application No. 2 114 342 For the purpose of the description of the present invention, it is sufficient to know that apparatus for performing a fast Fourier transform comprises a processor, a random access memory, a program stored in read only memory, memory addressing means and a communal data bus. The read only memory holds all the processor operating instructions necessary for the complete transformation process.

The discrete Fourier transform, and its derivation the fast Fourier transform (FFT), predict that a continuous waveform can be represented in the frequency domain and in the time domain by the sums of complex series of terms both of which involve a set of Fourier coefficients. It is in the nature of the transform process that calculations for all frequency components, from zero frequency upwards, must be performed in every transformation. Inevitably where the fundamental frequency component of a continuous signal is relatively high, many of the early i.e. lower order coefficients of the Fourier series have zero value. Thus much valuable computation time may be wasted in redundant or useless calculations. Heterodyning of a received signal into base-band therefore offers substantial time savings by eliminating these unwanted calculations. However, the step of heterodyning down may introduce its own problems, not least of which is interference and consequent degradation of results caused by beat frequencies generated in base-band as a result of the sum and difference frequencies between the heterodyne frequency and components of the received signal.

The present invention has for one object to cancel the effect of any beat frequencies which may occur. The invention also possesses other advantages and possibilities which will be indicated, as they arise, in the following description.

According to the present invention, there is provided apparatus of the kind employing a computer processing unit or the like for performing a fast Fourier transform on real time series samples of a received signal, including complex heterodyne means for performing a complex heterodyning operation on said signal whereby to generate two heterodyned signals having a quadrature phase relationship, first digital sampling means for obtaining time series digital samples of one of the heterodyned signals and loading said samples into a real data array for the Fourier transform process, and second digital sampling means for obtaining time series digital samples of the other of the heterodyned signals and loading said signals into an imaginary data array for the Fourier transform process.

The invention and how it may be carried into practice will now be described by way of example only with reference to the accompanying drawing, in which:

FIG. 1 shows a functional block diagram of a code detection module in a railway vehicle safety system.

The safety system is part of an automatic train protection system for a railway vehicle, the principle function of which is to prevent the train from being driven at more than a designated maximum speed. In the particular system being described, coded signals are transmitted to a train via the running rails and these are detected by antennae mounted on the front of the train. The received signals are processed and coded information signals concerning the target speed and maximum safe speed of the train are extracted and compared with signals representing the measured speed of the train. The latter are derived from tachogenerators mounted on the wheel axles, but these particular arrangements are not of present concern and equivalent arrangements may be employed alternatively.

In the driver's cab there is provided a mode selector switch interconnected with the safety system and which permits selection of one of four alternative operational modes: Automatic Train: Coded Manual: Restricted Manual: and No Mode. When automatic train or coded manual operation is selected comparison is made between measured train speed and designated maximum safe speed and an appropriate train speed control signal produced. When restricted manual mode is selected, comparison is made between measured train speed and a maximum train speed for the time being indicated for manual operation. If the maximum safe speed in any of these three modes is exceeded, then the train emergency brake relay is released, resulting in full emergency application of the brakes. Selection of no mode also results in release of the emergency brake relay and full emergency application of the brakes. Also, any failure detected in the safety system, which could result in unsafe operation, is also effective to release the emergency brake relay.

The coded signal is applied to the running rails via the normal track circuit transmitter. The signal consists of one of eight alternative carrier frequencies which, in the described system, are 4080 Hz, 4320 Hz, 4560 Hz, 4800 Hz, 5040 Hz, 5280 Hz, 5520 Hz and 6000 Hz according to a predetermined sequence which is described elsewhere and is of no consequence to the present invention. The eight carrier frequencies are frequency shift keyed (FSK) modulated by one of fourteen modulation frequencies from 28 Hz to 80 Hz at 4 Hz spacing, the carrier frequency being shift keyed at ±40 Hz. The carrier frequencies are changed between track circuits according to a predetermined frequency and the modulation frequencies are selected according to the coded information to be transmitted to the train.

The coded FSK signal is received by two forward antennae 1L and 1R mounted over running rails ahead of the leading wheels of a train. These antennae are connected in series anti-phase so that any common mode interference signal present in the running rails, which have substantially similar amplitude and phase, will therefore be cancelled in the antennae circuits. The signals carried by the running rails are arranged generally in antiphase so as to be additive in the antennae circuits.

A duplicate set of "reverse" antennae is also provided at the rear of the train for use when the train is moving in reverse, and the forward or reverse antennae are selected via switching means 2.

Detection of the signal carrier frequency and modulation frequencies is carried out in a code detection module, which forms the major part of FIG. 1. The module functions in two stages and employs the same fast Fourier transform in both stages. In the first stage it identifies the carrier frequency present in a received signal, and then selects an intermediate frequency in accordance with the detected carrier signal and, in a second stage of operation, heterodynes the received signal down to base-band, performs a second fast Fourier transform and analyses the resulting frequency spectrum to determine the modulation frequency present, and hence the designated maximum safe speed.

The antennae signals may be pre-amplified by pre-amplifier circuits (not shown but indicated by AP) and are connected via the forward/reverse switch 2 through a broad-band noise rejection filter 3 to a threshold limiting circuit 4. The limiter 4 operates to amplify low level signals and to limit all signals above a predetermined threshold. The broad-band noise rejection filter 3 in front of limiter 4 prevents out-of-band interference swamping the limiter and ensures any received signal is compatible with the dynamic range of the code detection module.

The signal output of limiter 4 is connected through an anti-alias filter 5 to the analogue input of an analogue to digital (AD) converter 6 operated at a predetermined sampling rate fs of 15,360 Hz. The digital samples are read-out from the AD converter 6 onto a databus 7 and into data memory means which, in the drawing, is included with the block 8 labelled "128 point complex FFT"

This block 8 is the apparatus which performs the fast Fourier transformation, and as previously mentioned is to be taken as comprising a random access memory for the data storage, a read only memory for program storage, addressing means, processing unit and the necessary timing and sequencing circuits etc. This apparatus is of known form and well understood. A more detailed exposition of a suitable design may be had from published British application No. 2 114 342. It is sufficient for present purposes to present this whole apparatus by a single block so as to avoid unnecessary complications of the drawing.

The aforementioned data memory means comprises data arrays which for the purposes of storing input data for a fast Fourier transform algorithm are called the real array and the imaginary array. In this instance there is only a single set of data points, the data being loaded into one array and the other being set to zero.

Upon completion of the 128 point transformation in block 8, an output is produced comprising the frequency spectrum of the received signal. In at least one of the eight frequency elements or bins corresponding to the eight alternative carrier frequencies, there will be a sufficiently high level of output to positively indicate the presence of a signal at the corresponding carrier frequency. One of these is selected for further processing.

In response to selection of one of the carrier frequencies present in the received signal, a programmable oscillator 9 is set to produce an ouput frequency equal to twice a heterodyne frequency required to generate heterodyned products of the modulated and shiftkeyed frequencies in the base-band. The heterodyne frequency is equal to the selected carrier frequency.

A programmable oscillator is a circuit in which a binary number, which is provided externally, is connected to an input and is used to control an arrangement of source frequency oscillators and dividing counters. The device is effectively a free running multivibrator, the frequency of which is determined by a binary number at the input.

The output of programmable oscillator 9 is supplied to a balanced demodulator 10 which performs the complex heterodyne operation. The output of anti-alias filter 5 is connected to the inputs of two parallel mixers 11 and 12 in demodulator 10. The heterodyne signal inputs of these two mixers 11 and 12 are connected to the output of programmable oscillator 9 through respective divide-by-two circuits 13 and 14, the circuit 13 being connected to oscillator 9 through an inverting circuit 15. The divide-by-two circuits 13 and 14 are triggered by the leading edges of their respective input signals. Thus, circuit 13 is effectively triggered from a trailing edge of the output of oscillator 9. As a result, the heterodyne frequencies supplied to mixers 11 and 12 are produced in phase and in quadrature relationship with the output signal of oscillator 9 and at half its frequency.

The outputs of mixers of 11 and 12 are connected through respective low pass filters 16, 17 to analogue to digital converters and sampling circuits 18, 19 operated by a sampling clock (not shown) at a sampling frequency fs of 512 Hz. The digital outputs of converters 18 and 19 are also connected to the databus 7 and are thus effectively in parallel with analogue to digital converter 6.

The data from converters 18 and 19 may be selectively read into the conjugate data arrays of FFT processor 20 for subsequent execution of the 128 point fast Fourier transform in order to construct a complete frequency spectrum of the base-band of a received signal. The results of the transformation process comprise a digital calculation of the total power present within each frequency element or frequency bin of the whole signal spectrum. The output of processor 20 is shown coupled to an analysis function block 21, the construction and operation of which is not necessary for the present description. Suffice it to say that block 21 detects the frequency components found in the received signal spectrum and, subject to pre-ordained safety rules, carries out certain safety functions. The output of block 21 is applied to a communication bus (C-BUS) via a latch operated by an input on a "read communication" line (READ COM), there also being a processor reset line and a C-BUS request line for the block 21.

I claim:

1. Apparatus for performing a fast Fourier transform, comprising:

means for receiving an input signal;

complex heterodyne means for performing a complex heterodyning operation on said input signal to generate first and second heterodyned signals having a quadrature phase relationship, said complex heterodyne means comprising:

first and second heterodyne mixing circuits;

means for detecting a carrier signal of a received input signal and producing a control signal in dependence on the frequency of said detected carrier signal;

a signal source connected to said detecting means to receive said control signal, said signal source producing a dependent signal at a frequency determined in dependence on said control signal; and heterodyne signal generating means connected to said signal source for using said dependent signal at a determined frequency to generate first and second local heterodyne signals having the same frequency as each other and having a quadrature phase relationship with each other, said generating means connected to each of said heterodyne mixing circuits for transmiting respective ones of said first and second local heterodyne signals thereto;

processor means for performing a fast Fourier transform, the processor means having a real data array for the Fourier transform process and an imaginary data array for the Fourier transform process;

first digital sampling means, connected to an output of said first heterodyne mixing circuit, for receiving said first heterodyned signal, obtaining real time series samples of said first heterodyned signal and loading these samples into said real data array; and second digital sampling means, connected to an output of said second heterodyne mixing circuit, for receiving said second heterodyned signal, obtaining real time series samples of said second heterodyned signal and loading these samples into said imaginary data array.

2. Apparatus as claimed in claim 1, wherein said detecting means for detecting a carrier signal of a received input signal comprises further digital sampling means for obtaining real time series samples of the received signal and a second processor means for performing a fast Fourier transform on said real time series samples of the received signal.

3. Apparatus as claimed in claim 1, wherein said signal source provides said dependent signal at a determined frequency which determined frequency is a selected one of a number of predetermined alternative frequencies only.

4. Apparatus as claimed in claim 1, wherein said signal source provides said dependent signal at a determined frequency which frequency is twice said carrier frequency and wherein said heterodyne signal generating means provides said heterodyne signals at half said determined frequency of said dependent signal.

5. Apparatus as claimed in claim 4, wherein said signal source includes a square wave signal generator and said heterodyne signal generating means is triggered by leading edges of the square wave to provide said first heterodyne signal and by trailing edges of the square wave to provide said second heterodyne signal.

6. Apparatus as claimed in claim 1, in a safety system of a vehicle, in which system an encoded carrier signal tranmitted to the vehicle must be correctly received and decoded for vehicle operation to continue, wherein said receiving means of the apparatus received the encoded signal as an input signal, there being safety means coupled to said processor means and responsive to the results produced thereby.

* * * * *